March 23, 1926.                                                        1,578,062
                          R. C. AMBERG
                             BUMPER
                       Filed Sept. 29, 1925

Rudolph C. Amberg, INVENTOR.

BY

Geo. F. Kimmel   ATTORNEY.

Patented Mar. 23, 1926.

1,578,062

UNITED STATES PATENT OFFICE.

RUDOLPH C. AMBERG, OF CHOKIO, MINNESOTA.

BUMPER.

Application filed September 29, 1925. Serial No. 59,289.

*To all whom it may concern:*

Be it known that I, RUDOLPH C. AMBERG, a citizen of the United States, residing at Chokio, in the county of Stevens and State of Minnesota, have invented certain new and useful Improvements in Bumpers, of which the following is a specification.

This invention relates to bumpers for motor vehicles, and has for its object to provide, in a manner as hereinafter set forth, a winged bumper whereby the wings thereof will swing back at an angle and provide a guard for the front wheels and further causing the object or obstruction hit by the bumper to glance thereoff, and furthermore in case of impact against a person will push him to one side and not straight ahead in the direction of travel of the vehicle.

Further objects of the invention are to provide, in a manner as hereinafter set forth, a bumper of the winged type, which is simple in its construction and arrangement, strong, durable, compact, thoroughly efficient in its use, readily installed with respect to the front of the motor vehicle, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
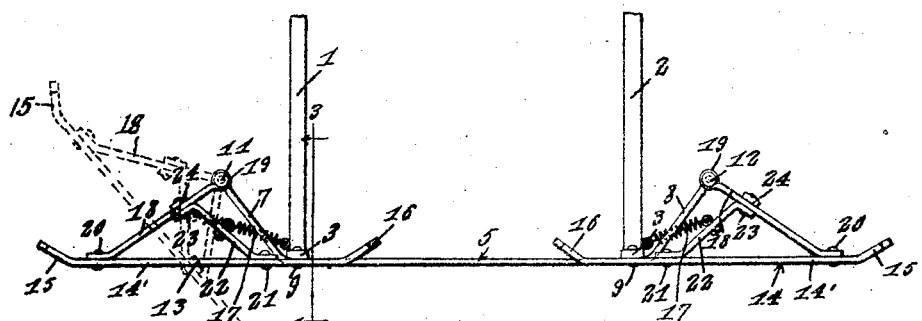
Figure 1 is a top plan view of a bumper, in accordance with this invention, and further illustrating in dotted lines one of the wings shifted by impact.
Figure 2:
Figure 2 is a front elevation thereof.
Figure 3:
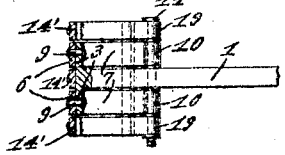
Figure 3 is a section on line 3—3, Figure 1.

A bumper, in accordance with this invention, comprises a pair of spaced supporting members 1, 2, adapted to be secured to the front of the vehicle and project forwardly therefrom. Each of the supports 1, 2 is in the form of a substantially elongated rod of any suitable cross section, and provided at its forward end with a flat head 3, which extends above and projects below the rod.

Positioned against the heads 3, extending transversely with respect thereto, as well as projecting laterally and rearwardly therefrom at an outward inclination is a pair of spaced bumper members 4, 5, each formed from a flat strip of suitable metallic material and consisting of an intermediate portion 6 and a pair of rearwardly extending and outwardly inclined end portions 7, 8, which are oppositely disposed with respect to each other. The ends of the intermediate portion 6 of the bumper members 4, 5, are fixedly secured to the head 3 by the holdfast devices 9, and said bumper members 4, 5 are arranged above and below the supports 1, 2. The rear end of each of the end portions 7, 8, is bent to provide a barrel 10 for connecting the said members to a pair of vertically disposed pivot bolts 11, 12, and each of these latter forms a pivot for a set of superposed wing members.

The wing members of the set which are associated with the pivot bolt 11 are referred to generally by the reference character 13, and the wing members of that set which associates with the pivot bolt 12 are generally referred to by the reference character 14. Each wing member of either of the sets of wing members consists of an intermediate portion 14′ and a pair of rearwardly extending and outwardly inclined end portions 15, 16, of less length than the intermediate portion 14′. As shown, the number of wing members of each set consists of three and are of a length to be arranged in superposed relation with respect to the members 4, 5, as well as to project laterally therefrom. The inner portion of the intermediate wing member of each set is interposed between the bumper members 4, 5, and the inner portion of the other wing members of the set is arranged above and below respectively said bumper members 4, 5. The wing members are spaced from the bumper members 4, 5, and are spring controlled for the purpose of normally maintaining the wing members in the position shown in Figure 1. The controlling springs for the wing members are indicated at 17.

Fixedly secured to the rear face of each of the wing members of each set is a rearwardly extending inclined arm 18, provided with a barrel 19 to pivotally connect said arm to a bolt 11 or 12. The forward end of the arm 18 is fixedly secured by the hold-fast device 20 to a wing member in proximity to the rearwardly extending end portion 15. Secured to the rear of the intermediate portion 14' of each wing member by the hold-fast device 21 is a rearwardly extending and outwardly inclined brace piece 22, which is fixedly secured by the hold-fast device 23 to the arm 18, intermediate the ends thereof. The arms 18, in connection with the bolts 11 or 12, provide a pivotal connection for a wing member, and said arms 18 are braced through the medium of the brace pieces 22.

The arms 18 of each set of wing members are connected together by a coupling strip 24, which is secured to said arm by the hold-fast devices 23, and by this arrangement the set of wing members shifts in unison and against the action of the controlling spring therefor, and as before stated the controlling springs for the sets of wing members normally maintain them in what may be termed a forward position and which is such that the intermediate portions 14' of said wing members extend in the plane of the intermediate portion 6 of the bumper members 4, 5.

The sets of wings are so arranged with respect to the bumper members 4, 5, that when a set is struck the set will swing back at an angle and form a guard over the wheel so that the object will glance off the set, and if a set is struck by a person, the said person will not be thrown straight ahead with respect to the direction of travel of the car, but will be pushed to one side and be prevented from being run over.

It is thought the many advantages of a winged bumper construction, in accordance with this invention, can be readily understood, and although the preferred embodiment of the invention is as illustrated and described, yet it is to be understood that changes in the details of construction can be had which will fall within the scope of the invention as claimed.

What I claim is:—

1. A bumper comprising a pair of superposed bumper members having rearwardly extending end portions, a pair of pivot bolts carried by said end portions, two sets of superposed spring controlled wing members, the wing members of each set being alternately disposed with respect to said bumper members and projecting laterally therefrom, and means carried by the wing members of each set for pivotally connecting them with a pivot bolt.

2. A bumper comprising a pair of superposed bumper members having rearwardly extending end portions, a pair of pivot bolts carried by said end portions, two sets of superposed spring controlled wing members, the wing members of each set being alternately disposed with respect to said bumper members and projecting laterally therefrom, and means carried by the wing members of each set for pivotally connecting them with a pivot bolt, each of the wing members of each set having a rearwardly extending inclined end portion.

3. A bumper comprising a plurality of superposed spaced bumper members adapted to be fixedly connected to the front of a motor vehicle and spaced therefrom, each of said members having each of its end terminal portions extending rearwardly, two sets of spring controlled wing members, the wing members of each set being connected together and arranged in spaced relation and further having the inner portions thereof alternately disposed with respect to said bumper members, and means for pivotally connecting said sets to the end terminal portions of the bumper members to provide for an angular shift of said sets with respect to said bumper members.

4. A bumper comprising a plurality of superposed spaced bumper members adapted to be fixedly connected to the front of a motor vehicle and spaced therefrom, each of said members having each of its end terminal portions extending rearwardly, two sets of spring controlled wing members, the wing members of each set being connected together and arranged in spaced relation and further having the inner portions thereof alternately disposed with respect to said bumper members, and means for pivotally connecting said sets to the end terminal portions of the bumper members to provide for an angular shift of said sets with respect to said bumper members, each of said wing members having the end terminal portions thereof extended rearwardly with respect to the intermediate portion thereof.

5. A bumper for motor vehicles comprising a pair of bumper members, means adapted to be connected to the front of the vehicle for supporting said members forwardly of the latter, a set of spring controlled, angularly shiftable wing members projecting from each end of the bumper members, and means for pivotally connecting said sets with the ends of said bumper members, the members of each of said sets being alternately disposed with respect to said bumper members.

6. A bumper for motor vehicles comprising a pair of spaced bumper members having rearwardly extending and outwardly inclined end terminal portions, pivot bolts carried by said end terminal portions, a set of connected wing members extending laterally from each end of said bumper members, means for pivotally connecting the said sets to said bolts, controlling springs for said sets, said sets having the inner portions of the members thereof alternately arranged with respect to said bumper members, and means for supporting said bumper members from the front of the vehicle.

In testimony whereof, I affix my signature hereto.

RUDOLPH C. AMBERG.